United States Patent [19]
Sato

[11] Patent Number: 6,128,318
[45] Date of Patent: Oct. 3, 2000

[54] METHOD FOR SYNCHRONIZING A CYCLE MASTER NODE TO A CYCLE SLAVE NODE USING SYNCHRONIZATION INFORMATION FROM AN EXTERNAL NETWORK OR SUB-NETWORK WHICH IS SUPPLIED TO THE CYCLE SLAVE NODE

[75] Inventor: Takashi Sato, Scarborough, N.Y.

[73] Assignee: Philips Electronics North America Corporation, New York, N.Y.

[21] Appl. No.: 09/012,321

[22] Filed: Jan. 23, 1998

[51] Int. Cl.[7] .............................. H04J 3/06; G06F 13/00; G06F 1/12

[52] U.S. Cl. ...................... 370/503; 370/507; 370/508; 370/510; 395/200.78; 395/358; 395/553

[58] Field of Search ..................................... 370/503, 510, 370/507, 508, 516, 519; 395/553, 356, 358, 359, 200.78, 200.31; 375/356, 357

[56] References Cited

U.S. PATENT DOCUMENTS

| | | | |
|---|---|---|---|
| 4,815,110 | 3/1989 | Benson et al. | 375/107 |
| 5,206,857 | 4/1993 | Farleigh | 370/85.5 |
| 5,235,597 | 8/1993 | Himwich et al. | 370/110.1 |
| 5,327,425 | 7/1994 | Niwa et al. | 370/85.1 |
| 5,408,506 | 4/1995 | Mincher et al. | 375/356 |
| 5,689,688 | 11/1997 | Strong et al. | 395/553 |
| 5,907,685 | 5/1999 | Douceur | 395/200.78 |
| 5,918,040 | 6/1999 | Jarvis | 395/553 |

*Primary Examiner*—Huy D. Vu
*Assistant Examiner*—M. Phan
*Attorney, Agent, or Firm*—Daniel J. Piotrowski

[57] ABSTRACT

A method for synchronizing a cycle master node to a cycle slave node, including the steps of utilizing logic circuitry in the cycle slave node to determine a timer offset value, in response to the cycle slave node receiving synchronization information, transmitting the timer offset value to the cycle master node, and, utilizing logic circuitry in the cycle master node to adjust a value of a cycle master node cycle timer on the basis of the timer offset value. The synchronization information is preferably a cycle reset signal that is asserted at a prescribed rate which is a multiple of one cycle of the cycle slave node cycle timer. The cycle master node and the cycle slave node can advantageously be included in a first network or sub-network and the cycle reset signal can be supplied by a second network or sub-network which is external to the first network or sub-network.

38 Claims, 1 Drawing Sheet

METHOD FOR SYNCHRONIZING A CYCLE MASTER NODE TO A CYCLE SLAVE NODE USING SYNCHRONIZATION INFORMATION FROM AN EXTERNAL NETWORK OR SUB-NETWORK WHICH IS SUPPLIED TO THE CYCLE SLAVE NODE

BACKGROUND OF THE INVENTION

The present invention relates generally to the technology of synchronizing cycle master and cycle slave nodes in one or more networks or sub-networks, and, more particularly, to a technique for synchronizing a cycle master node to a cycle slave node using synchronization information from an external network or sub-network which is supplied to the cycle slave node.

In conventional networks, various electronic components (e.g., computers, consumer electronics devices, appliances, office automation equipment, etc.) are interconnected by a local bus (typically a serial bus, such as the serial bus defined by the IEEE 1394 standard, which is commonly referred to as the "IEEE 1394" bus). Each of the components interconnected by the local bus are referred to as "nodes" on that bus. Typically, one of the nodes on the local bus (commonly referred to as the "local cycle master") serves to generate and distribute a common cycle clock to all other nodes (commonly referred to as "cycle slave nodes") on that bus. In general, each of the cycle slave nodes has a cycle timer which is synchronously updated by the local cycle master.

Some networks consist of a plurality of individual networks (each of which has its own local bus). These individual networks within the overall network are commonly referred to as "sub-networks". The sub-networks are linked or interconnected by one or more "bridges".

Some networks employ network-wide cycle clock ("cycle") synchronization. When the network is subdivided into sub-networks, the local cycle master of each sub-network must be synchronized to the network-wide ("global") cycle master in order to ensure the network-wide clock synchronization. In such networks, each of the local cycle masters are located in one or more of the bridges within the network. Typically, each local cycle master is contained within a "bridge portal".

For example, in a known network having two sub-networks which are interconnected by a bridge having a first bridge portal connected to the local bus of a first one of the two sub-networks, and a second bridge portal connected to the local bus of a second one of the two sub-networks, the local cycle master for the first sub-network is contained in the first bridge portal, and the local cycle master for the second sub-network is contained in the second bridge portal. Network-wide clock synchronization is achieved by passing the clock synchronization information between the local cycle masters (i.e., between the first and second bridge portals). However, it is not always desired or even possible to locate the local cycle masters in the bridges. Thus, what is required is a technology which allows a non-bridge node to be the local cycle master while ensuring the network-wide clock synchronization through one or more bridges within the network. More broadly, what is presently needed in this field is a mechanism to synchronize a cycle master node to one of the cycle slave nodes within a network which includes one or more sub-networks. The present invention fufills this need.

SUMMARY OF THE INVENTION

The present invention, in one of its aspects, encompasses a method for synchronizing a cycle master node to a cycle slave node, including the steps of utilizing logic circuitry in the cycle slave node to determine a timer offset value, in response to the cycle slave node receiving synchronization information, transmitting the timer offset value to the cycle master node, and, utilizing logic circuitry in the cycle master node to adjust a value of a cycle master node cycle timer on the basis of the timer offset value. The synchronization information is preferably a cycle reset signal that is asserted at a prescribed rate which is a multiple of one cycle of the cycle slave node cycle timer. In the disclosed embodiment, the cycle slave node further includes a timer offset register, and the cycle master node further includes a timer adjustment register.

The step of utilizing the logic circuitry in the cycle slave node to determine the timer offset value preferably includes the sub-steps of:

detecting the cycle reset signal;

reading a value of the cycle slave node cycle timer;

deriving the timer offset value from the value read out of the cycle slave node cycle timer; and, loading the timer offset value into the timer offset register.

The step of transmitting the timer offset value to the cycle master node preferably includes the sub-steps of:

reading the timer offset value from the timer offset register; and, sending the timer offset value to the cycle master node using an asynchronous data transfer protocol.

The step of utilizing the logic circuitry in the cycle master node to adjust a value of the cycle master node cycle timer preferably includes the sub-steps of:

loading the timer offset value received from the cycle slave node into the timer adjustment register;

reading a value of the cycle master node cycle timer;

subtracting the timer offset value from the value read out of the cycle master node cycle timer to produce an adjusted cycle timer value;

deriving a final adjusted cycle timer value from the adjusted cycle timer value; and, loading the final adjusted cycle timer value into the cycle master node cycle timer.

The sub-step of deriving the timer offset value from the value read out of the cycle slave node cycle timer preferably includes the sub-steps of:

calculating a number of clock cycles that have elapsed between a first time at which the cycle reset signal was detected and a second time at which the value was read out of the cycle slave node cycle timer; and, subtracting the result of the above calculating step from the value read out of the cycle slave node cycle timer, whereby the result of the subtracting step constitutes the timer offset value.

The sub-step of deriving the final adjusted cycle timer value preferably includes the sub-steps of:

calculating a number of clock cycles required to perform all required processing starting from a first time at which the value is read out of the cycle master node cycle timer and ending with a second time at which the final adjusted cycle timer value is loaded into the cycle master node cycle timer; and, adding the result of the above calculating sub-step to the adjusted cycle timer value, whereby the result of the adding step is the final adjusted cycle timer value.

In a disclosed embodiment, the cycle master node and the cycle slave node are part of a first network or sub-network, and the synchronization information is supplied by a second network or sub-network that is external to the first network or sub-network.

Preferably, the method of the present invention further includes the step of regularly distributing the value of the cycle master node cycle timer to all of the cycle slave nodes in the first network or sub-network, whereby all of the cycle slave nodes in the first network or sub-network are synchronized to the cycle reset signal.

The present invention encompasses, in another of its aspects, a system implements the method of the present invention. The present invention also encompasses a network which includes:
- a first sub-network which includes a plurality of first nodes connected to a first local bus;
- a second sub-network which includes a plurality of second nodes connected to a second local bus;
- a bridge which interconnects the first and second sub-networks, wherein the bridge includes:
  - a first bridge portal coupled to the first local bus;
  - a second bridge portal coupled to the second local bus; and,
  - an interconnect system which interconnects the first and second bridge portals; and,
- wherein a selected one of the first nodes which serves as a local cycle master of the first sub-network is a non-bridge node, and a selected one of the second nodes which serves as a local cycle master of the second sub-network is a non-bridge node.

In a disclosed embodiment, the first and second bridge portals each contain a cycle slave node constructed in accordance with the present invention, and the local cycle masters for the first and second sub-networks each comprise a cycle master node constructed in accordance with the present invention.

BRIEF DESCRIPTION OF THE DRAWINGS

These and other features, objects, and advantages of the present invention will become more clearly understood from the following detailed description read in conjunction with the attached drawings, in which.

DETAILED DESCRIPTION OF THE INVENTION

Figure 1:
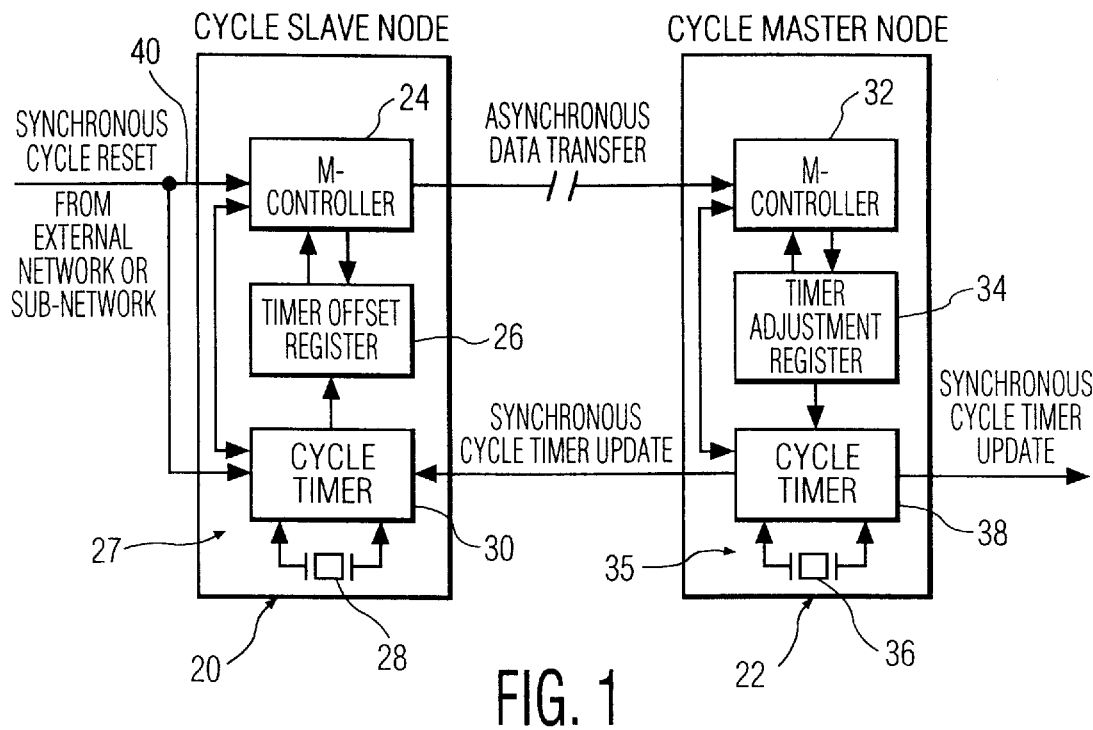
FIG. 1 is a block diagram of a system which implements the method of a preferred embodiment of the present invention.

With reference now to FIG. 1, there can be seen a block diagram of a system which implements the method of the present invention, which will now be described. More particularly, there can be seen a cycle slave node 20 and a cycle master node 22. The cycle slave node includes a microcontroller 24, a timer offset register 26, and a cycle clock subsystem 27 which includes a cycle timer 30 that is clocked by a crystal 28 which runs at a prescribed clock. The cycle master node 22 includes a microcontroller 32, a timer adjustment register 34, and a cycle clock subsystem 35 which includes a cycle timer 38 that is clocked by a crystal 36 which runs at the prescribed clock rate. Each of the cycle timers 30 and 38 preferably includes separate registers or data fields, including one field for storing a fractional value which indicates the fraction of the current cycle which the current timer value (i.e., current count) represents, and another field for storing a total cycle count which indicates the total (running/cumulative) number of cycles which the cycle timer has gone through.

As in conventional networks, the cycle master node 22 regularly distributes its cycle timer value to all of the other nodes (i.e., all of the cycle slave nodes) in the network or local sub-network which it is a part of, whereby the cycle timers in all of the cycle slave nodes (including the cycle timer 30 in the cycle slave node 20) within that network or sub-network are each synchronized to the cycle timer 38 in the cycle master node 22.

However, in accordance with the present invention, one of the cycle slave nodes in the network or sub-network, shown as the cycle slave node 20 in FIG. 1, receives a synchronous timer reset signal from an external network or sub-network, via reset line 40. This reset signal is regularly asserted at a prescribed rate that is preferably a multiple of one cycle.

A "cycle" as the term is used herein refers to the time period required for a cycle timer to count from an initial value to its final value, whereupon the timer register wraps around and goes back to its initial value. For example, if the cycle timer is implemented as a modulo-N counter, then a "cycle" is the time period required for the counter to count from its initial value (A) to (A)+N−1 before wrapping back around to its initial value (A). The initial value is typically zero (0).

In accordance with the present invention, the microcontroller 24 of the cycle slave node 20 is programmed to perform a control algorithm which includes the following steps:

(1) detect the external synchronous cycle reset signal;

(2) read the fractional value (less than one cycle) of the cycle timer 30. Preferably, the fractional value is expressed as an integer which is positive if the current cycle timer value (i.e., current count) is less than or equal to N/2, and which is negative if the current cycle timer value is greater than N/2, although this scheme is not limiting to the present invention (e.g., the threshold for positive/negative transition can be set at any suitable value between the initial value and maximum value of the cycle timer 30). For example, assuming the cycle timer 30 has a modulus (N) of 8,000, then the fractional value (I) can be expressed as a positive integer value equal to the current count (X) of the cycle timer 30 if the current count is ≦4,000, and can be expressed as a negative integer value equal to the difference between the current count (X) and the modulus (N) of the cycle timer 30 if the current count (X) is >4,000, i.e., if X≦N/2, then I=X, which is a positive integer value, and if X>N/2, then I=(X−N), which is a negative integer value;

(3) calculate how many clock cycles have passed between the time that the external synchronous cycle reset signal was detected and the time the fractional cycle timer value was read;

(4) subtract the result of step (3) from the fractional cycle timer value read in step (2);

(5) load the result of step (4) as a timer offset value in the timer offset register 26; and, (6) read the timer offset value from the timer offset register 26 and send that timer offset value to the cycle master node 22 at a convenient time, e.g., using an asynchronous data transfer mechanism. However, if the timer offset value is zero, it does not need to be sent to the cycle master node 22 (since, in that event, no adjustment of the value of the cycle timer 38 in the cycle master node 22 is necessary).

It should be readily appreciated that steps (3) and (4) can be eliminated if the invention is implemented entirely in hardware (rather than using a programmed microcontroller), or in any other convenient manner which eliminates this processing delay or which results in a fixed processing delay which can be accounted for as such in deriving the timer offset value.

In further accordance with the present invention, the microcontroller 32 of the cycle master node 22 is programmed to perform a control algorithm which includes the following steps:

(1) load the timer offset value received from the cycle slave node 20 into the timer adjustment register 34;

(2) read the fractional value (less than one cycle) of the cycle timer 38.

(3) subtract the timer offset value read out of the timer adjustment register 34 in step (1) from the fractional cycle timer value read out of the cycle timer 38 in step (2);

(4) calculate how many clock cycles are required to perform all required processing starting from the time that the fractional cycle timer value is read out of the cycle timer 38 in step (2) and ending with the time that the final (adjusted) cycle timer value is loaded into the cycle timer 38 (i.e., at step (6) below);

(5) add the result of step (3) to the result of step (4), and perform any required wrap-around processing of the cycle timer 38. For example, in the event the sum is greater than the maximum value (i.e., in the event an overflow condition has occurred), then the modulus (N) of the cycle timer 38 must be subtracted from the sum to arrive at a resultant value, and the total cycle count must then be incremented by one; and, in the event the sum is less than the initial value (i.e., in the event an underflow condition has occurred), then the modulus (N) of the cycle timer 38 must be added to the sum to arrive at a resultant value, and the total cycle count must then be decremented by one; and, (6) load the resultant value of step (5), which constitutes an adjusted cycle timer value, into the cycle timer 38.

It should be readily appreciated that step (4) can be eliminated if the invention is implemented entirely in hardware (rather than using a programmed microcontroller), or in any other convenient manner which eliminates this processing delay or which results in a fixed processing delay which can be accounted for as such in deriving the timer offset value.

By virtue of the above-described method of the present invention, the cycle timer value of the cycle master node 22 is synchronized to the external synchronous cycle reset signal, thus keeping the cycle timers in all of the cycle slave nodes (including the cycle timer 30 in the cycle slave node 20) within the network or sub-network synchronized to the external synchronous cycle reset signal. It will be appreciated by those skilled in the pertinent art that the method (and system) of the present invention is simple, reliable, and relatively immune to data (e.g., packet) losses or infrequent feedback from the cycle slave node.

Figure 2:
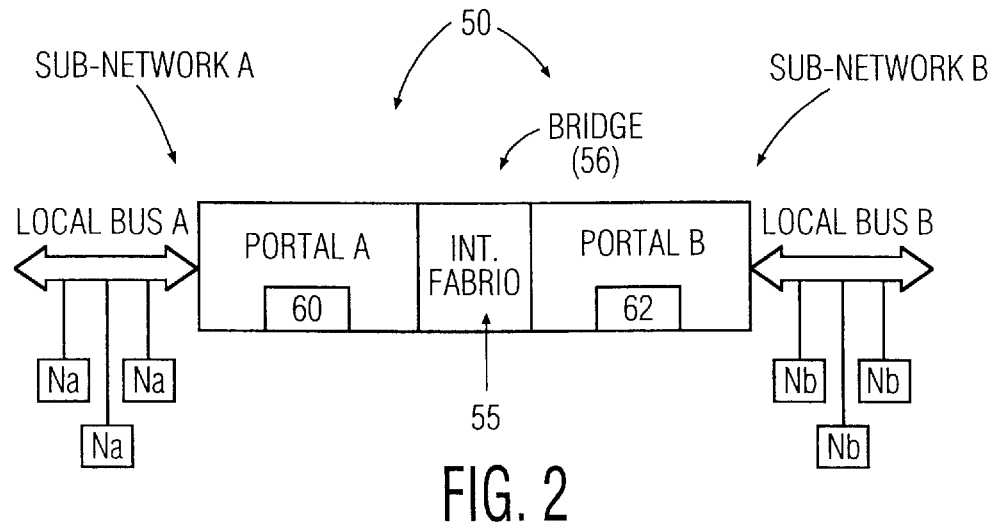
FIG. 2 is a block diagram of a network constructed in accordance with an exemplary embodiment of the present invention; and, FIG. 3 is a block diagram of a network constructed in accordance with another exemplary embodiment of the present invention.

With reference now to FIG. 2, there can be seen a network 50 constructed in accordance with an exemplary embodiment of the present invention. The network 50 includes a plurality of nodes Na connected to a local bus A of a sub-network A and a plurality of nodes Nb connected to a local bus B of a sub-network B. The sub-networks A and B are interconnected by a bridge 56 which includes a bridge portal A which is coupled to the local bus A, and a bridge portal B which is coupled to the local bus B. The bridge portals A and B are interconnected by a wired or wireless interconnect system (sometimes referred to as an "internal fabric") 55.

The bridge portal A contains a cycle slave node 60 constructed in accordance with the present invention (e.g., like the cycle slave node 20 depicted in FIG. 1), and the bridge portal B contains a cycle slave node 62 constructed in accordance with the present invention (e.g., like the cycle slave node 20 depicted in FIG. 1).

The local cycle master for the sub-network A (which is like the cycle master node 22 depicted in FIG. 1) can advantageously be any selected one of the nodes Na connected to the local bus A of the sub-network A, and the local cycle master for the sub-network B (which is like the cycle master node 22 depicted in FIG. 1) can advantageously be any selected one of the nodes Nb connected to the local bus B of the sub-network B.

Thus, with this exemplary embodiment, all of the nodes Na of the sub-network A, except for the one designated to be the local cycle master, are suitably implemented as conventional slave nodes, and all of the nodes Nb of the sub-network B, except for the one designated to be the local cycle master, are also suitably implemented as conventional slave nodes. Thus, each of the local cycle masters is a non-bridge node. Of course, it will be readily apparent that, alternatively, either one of the bridge portals A or B can contain the cycle master node, rather than the cycle slave node, in which case, only one of the local cycle masters is a non-bridge node.

Figure 3:
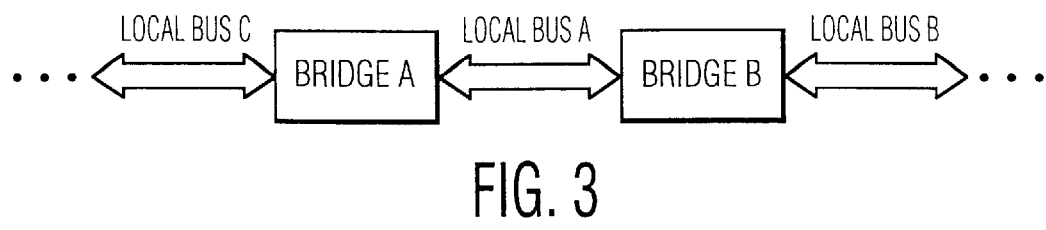

With reference now to FIG. 3, there can be seen a network 66 constructed in accordance with another exemplary embodiment of the present invention. The network 66 includes a plurality of local buses, including local buses A, B, and C, and a plurality of bridges, including bridges A and B. It will be readily appreciated that the number of bridges and buses in the network 66 that can be daisy-chained together is virtually unlimited.

With the presently available technology, a fixed one of the two bridges A or B must contain the local cycle master for local bus A. However, with the present invention, it is possible for either selected one of the two bridges A or B to contain a cycle master node constructed in accordance with the present invention, and for the other one of the two bridges B or A to contain the cycle slave node constructed in accordance with the present invention. Thus, the network designer is afforded much greater flexibility in configuring or re-configuring the network, since he/she is not locked into a fixed one of the bridges A or B having to contain the local cycle master for the local bus A.

Although the present invention has been described in detail hereinabove, it should be clearly understood that many variations and/or modifications of the basic inventive concepts taught herein which may appear to those skilled in the pertinent art will still fall within the spirit and scope of the present invention as defined in the appended claims.

For example, although the control algorithms described hereinabove are executed by suitably-programmed microcontrollers 24 and 32, it will be readily apparent to those skilled in the pertinent art that any convenient hard-wired or programmable digital signal processing or logic circuitry could be alternatively utilized.

Further, although the timer offset register 26 and the timer adjustment register 34 have been described as separate registers, it will be readily apparent that they can be implemented as a single register in terms of addressing, if the invention is implemented in hardware, since in that case, the timer offset register 26 can be read-only, while the timer adjustment register 34 can be write-only.

The registers and logic circuitry employed to implement the method of the present invention can be implemented in software using existing link-layer chips (e.g., an IEEE 1394 link-layer chip), and can advantageously be implemented in hardware in future link-layer chips currently under development.

It should also be appreciated that every node (or selected nodes) within a given network can be manufactured to have the capability to serve as either a cycle master node or a cycle slave node in accordance with the present invention, e.g., by simply incorporating therein all of the necessary hardware and/or software, including both the timer offset register 26 and the timer adjustment register 34 (or equivalents thereof).

What is claimed is:

1. A method for synchronizing a cycle master node to a cycle slave node, including the steps of:

utilizing logic circuitry in the cycle slave node to determine a timer offset value, in response to the cycle slave node receiving synchronization information including a cycle reset signal, wherein determining the timer offset value includes calculating a number of clock cycles that have elapsed between a first time at which the cycle reset signal was detected and a second time at which the value was read out of the cycle slave node cycle timer; and, and subtracting the result of the above calculating step from the value read out of the cycle slave node cycle timer, whereby the result of the subtracting step constitutes the timer offset value;

transmitting the timer offset value to the cycle master node; and, utilizing logic circuitry in the cycle master node to adjust a value of a cycle master node cycle timer on the basis of the timer offset value.

2. The method as set forth in claim 1, wherein:

the cycle slave node further includes a cycle timer which counts from an initial value to a final value during a cycle; and, the cycle reset signal is asserted at a prescribed rate which is a multiple of one cycle of the cycle slave node cycle timer.

3. The method as set forth in claim 2, wherein:

the cycle slave node further includes a timer offset register;

the cycle master node further includes a timer adjustment register;

the step of utilizing the logic circuitry in the cycle slave node to determine the timer offset value includes the sub-steps of:

detecting the cycle reset signal;

reading a value of the cycle slave node cycle timer;

deriving the timer offset value from the value read out of the cycle slave node cycle timer; and, loading the timer offset value into the timer offset register.

4. The method as set forth in claim 3, wherein the step of transmitting the timer offset value to the cycle master node includes the sub-steps of:

reading the timer offset value from the timer offset register; and, sending the timer offset value to the cycle master node using an asynchronous data transfer protocol.

5. The method as set forth in claim 3, wherein the step of utilizing the logic circuitry in the cycle master node to adjust a value of the cycle master node cycle timer includes the sub-steps of:

loading the timer offset value received from the cycle slave node into the timer adjustment register;

reading a value of the cycle master node cycle timer;

subtracting the timer offset value from the value read out of the cycle master node cycle timer to produce an adjusted cycle timer value;

deriving a final adjusted cycle timer value from the adjusted cycle timer value; and, loading the final adjusted cycle timer value into the cycle master node cycle timer.

6. The method as set forth in claim 5, wherein the sub-step of deriving the final adjusted cycle timer value includes the sub-steps of:

calculating a number of clock cycles required to perform all required processing starting from a first time at which the value is read out of the cycle master node cycle timer and ending with a second time at which the final adjusted cycle timer value is loaded into the cycle master node cycle timer; and, adding the result of the above calculating sub-step to the adjusted cycle timer value, whereby the result of the adding step is the final adjusted cycle timer value.

7. The method as set forth in claim 5, wherein the sub-step of deriving the timer offset value from the value read out of the cycle slave node cycle timer includes the sub-steps of:

calculating a number of clock cycles that have elapsed between a first time at which the cycle reset signal was detected and a second time at which the value was read out of the cycle slave node cycle timer; and, subtracting the result of the above calculating step from the value read out of the cycle slave node cycle timer, whereby the result of the subtracting step constitutes the timer offset value.

8. The method as set forth in claim 7, wherein the sub-step of deriving the final adjusted cycle timer value includes the sub-steps of:

calculating a number of clock cycles required to perform all required processing starting from a first time at which the value is read out of the cycle master node cycle timer and ending with a second time at which the final adjusted cycle timer value is loaded into the cycle master node cycle timer; and, adding the result of the above calculating sub-step to the adjusted cycle timer value, whereby the result of the adding step is the final adjusted cycle timer value.

9. The method as set forth in claim 1, wherein:

the cycle master node and the cycle slave node are part of a first network; and, the synchronization information is supplied by a second network that is external to the first network.

10. The method as set forth in claim 1, wherein:

the cycle master node and the cycle slave node are part of a first sub-network; and, the synchronization information is supplied by a second sub-network that is external to the first sub-network.

11. The method as set forth in claim 2, wherein:

the cycle master node and the cycle slave node are part of a first sub-network which also includes a plurality of additional cycle slave nodes; and, the cycle reset signal is synchronously supplied by a second sub-network that is external to the first sub-network.

12. The method as set forth in claim 11, further including the step of regularly distributing the value of the cycle master node cycle timer to all of the cycle slave nodes in the first sub-network, whereby all of the cycle slave nodes in the first sub-network are synchronized to the cycle reset signal.

13. The method as set forth in claim 2, wherein:
the cycle master node and the cycle slave node are part of a first network which also includes a plurality of additional cycle slave nodes; and,
the cycle reset signal is synchronously supplied by a second sub-network that is external to the first network.

14. The method as set forth in claim 1, further including the step of regularly distributing the value of the cycle master node cycle timer to all of the cycle slave nodes in the first network, whereby the cycle timers of all of the cycle slave nodes in the first network are synchronized to the cycle reset signal.

15. The method as set forth in claim 8, wherein:
the cycle master node and the cycle slave node are part of a first sub-network which also includes a plurality of additional cycle slave nodes; and,
the cycle reset signal is synchronously supplied by a second sub-network that is external to the first sub-network.

16. The method as set forth in claim 15, further including the step of regularly distributing the value of the cycle master node cycle timer to all of the cycle slave nodes in the first sub-network, whereby all of the cycle slave nodes in the first sub-network are synchronized to the cycle reset signal.

17. The method as set forth in claim 8, wherein:
the cycle master node and the cycle slave node are part of a first network which also includes a plurality of additional cycle slave nodes; and,
the cycle reset signal is synchronously supplied by a second sub-network that is external to the first network.

18. The method as set forth in claim 17, further including the step of regularly distributing the value of the cycle master node cycle timer to all of the cycle slave nodes in the first network, whereby the cycle timers of all of the cycle slave nodes in the first network are synchronized to the cycle reset signal.

19. A system, including:
a cycle slave node which includes:
a cycle slave node cycle timer; and,
cycle slave node logic circuitry;
a cycle master node which includes:
a cycle master node cycle timer; and,
cycle master node logic circuitry;
wherein the cycle slave node logic circuitry is response to synchronization information that includes a cycle reset signal to determine a timer offset value by calculating a number of clock cycles that have elapsed between a first time at which the cycle reset signal was detected and a second time at which the value was read out of the cycle slave node cycle timer; and, subtracting the result of the above calculation from the value read out of the cycle slave node cycle timer, whereby the result of the subtraction constitutes the timer offset value and to transmit the timer offset value to the cycle master node; and,
wherein the cycle master node logic circuitry adjusts a value of the cycle master node cycle timer on the basis of the timer offset value.

20. The system as set forth in claim 19, wherein:
the cycle slave node cycle timer counts from an initial value to a final value during a cycle; and,
the cycle reset signal is asserted at a prescribed rate which is a multiple of one cycle of the cycle slave node cycle timer.

21. The system as set forth in claim 20, wherein:
the cycle slave node further includes a timer offset register;
the cycle master node further includes a timer adjustment register;
the cycle slave node logic circuitry determines the timer offset value by:
detecting the cycle reset signal;
reading a value of the cycle slave node cycle timer;
deriving the timer offset value from the value read out of the cycle slave node cycle timer; and,
loading the timer offset value into the timer offset register.

22. The system as set forth in claim 21, wherein the cycle slave node logic circuitry transmits the timer offset value to the cycle master node by:
reading the timer offset value from the timer offset register; and,
sending the timer offset value to the cycle master node using an asynchronous data transfer protocol.

23. The system as set forth in claim 21, wherein the cycle master node logic circuitry adjusts the value of the cycle master node cycle timer by:
loading the timer offset value received from the cycle slave node into the timer adjustment register;
reading a value of the cycle master node cycle timer;
subtracting the timer offset value from the value read out of the cycle master node cycle timer to produce an adjusted cycle timer value;
deriving a final adjusted cycle timer value from the adjusted cycle timer value; and,
loading the final adjusted cycle timer value into the cycle master node cycle timer.

24. The system as set forth in claim 23, wherein the cycle master node logic circuitry derives the final adjusted cycle timer value by:
calculating a number of clock cycles required to perform all required processing starting from a first time at which the value is read out of the cycle master node cycle timer and ending with a second time at which the final adjusted cycle timer value is loaded into the cycle master node cycle timer; and,
adding the result of the above calculation to the adjusted cycle timer value, whereby the result of the addition is the final adjusted cycle timer value.

25. The system as set forth in claim 23, wherein the cycle slave node logic circuitry derives the timer offset value from the value read out of the cycle slave node cycle timer by:
calculating a number of clock cycles that have elapsed between a first time at which the cycle reset signal was detected and a second time at which the value was read out of the cycle slave node cycle timer; and,
subtracting the result of the above calculation from the value read out of the cycle slave node cycle timer, whereby the the result of the subtraction constitutes the timer offset value.

26. The system as set forth in claim 25, wherein the cycle master node logic circuitry derives the final adjusted cycle timer value by:

calculating a number of clock cycles required to perform all required processing starting from a first time at which the value is read out of the cycle master node cycle timer and ending with a second time at which the final adjusted cycle timer value is loaded into the cycle master node cycle timer; and, adding the result of the above calculation to the adjusted cycle timer value, whereby the result of the addition is the final adjusted cycle timer value.

27. The system as set forth in claim 19, wherein:

the cycle master node and the cycle slave node are part of a first network; and, the synchronization information is supplied by a second network that is external to the first network.

28. The system as set forth in claim 19, wherein:

the cycle master node and the cycle slave node are part of a first sub-network; and, the synchronization information is supplied by a second sub-network that is external to the first sub-network.

29. The system as set forth in claim 20, wherein:

the cycle master node and the cycle slave node are part of a first sub-network which also includes a plurality of additional cycle slave nodes; and, the cycle reset signal is synchronously supplied by a second sub-network that is external to the first sub-network.

30. The system as set forth in claim 29, further including means for regularly distributing the value of the cycle master node cycle timer to all of the cycle slave nodes in the first sub-network, whereby all of the cycle slave nodes in the first sub-network are synchronized to the cycle reset signal.

31. The system as set forth in claim 20, wherein:

the cycle master node and the cycle slave node are part of a first network which also includes a plurality of additional cycle slave nodes; and, the cycle reset signal is synchronously supplied by a second sub-network that is external to the first network.

32. The system as set forth in claim 31, further including means for regularly distributing the value of the cycle master node cycle timer to all of the cycle slave nodes in the first network, whereby the cycle timers of all of the cycle slave nodes in the first network are synchronized to the cycle reset signal.

33. The system as set forth in claim 32, further including means for regularly distributing the value of the cycle master node cycle timer to all of the cycle slave nodes in the first sub-network, whereby all of the cycle slave nodes in the first sub-network are synchronized to the cycle reset signal.

34. The system as set forth in claim 26, wherein:

the cycle master node and the cycle slave node are part of a first network which also includes a plurality of additional cycle slave nodes; and, the cycle reset signal is synchronously supplied by a second sub-network that is external to the first network.

35. The system as set forth in claim 34, further including means for regularly distributing the value of the cycle master node cycle timer to all of the cycle slave nodes in the first network, whereby the cycle timers of all of the cycle slave nodes in the first network are synchronized to the cycle reset signal.

36. A network, including:

a first sub-network which includes a plurality of first nodes connected to a first local bus;

a second sub-network which includes a plurality of second nodes connected to a second local bus;

a bridge which interconnects the first and second sub-networks, wherein the bridge includes:

a first bridge portal coupled to the first local bus;

a second bridge portal coupled to the second local bus; and, an interconnect system which interconnects the first and second bridge portals; and, wherein a selected one of the first nodes which serves as a local cycle master of the first sub-network is a non-bridge node and wherein the first bridge portal contains a cycle slave node like the one defined in claim 23 and, the local cycle master for the first sub-network comprises a cycle master node like the one defined in claim 23.

37. The network as set forth in claim 36, wherein a selected one of the second nodes which serves as a local cycle master of the second sub-network is a non-bridge node.

38. The network as set forth in claim 37, wherein:

the second bridge portal contains a cycle slave node like the one defined in claim 26; and, the local cycle master for the second sub-network comprises a cycle master node like the one defined in claim 23.

* * * * *